(No Model.)

T. E. SIGLE & A. R. WENGER.
ADJUSTABLE AXLE NUT.

No. 459,842.        Patented Sept. 22, 1891.

Witnesses:
Saml. D. Stauffer
Howard B. Stauffer

Inventors:
Thomas E. Sigle
Abraham R. Wenger
By Dan. H. Herr.
Attorney.

UNITED STATES PATENT OFFICE.

THOMAS E. SIGLE, OF BUYERSTOWN, AND ABRAHAM R. WENGER, OF WEST EARL, PENNSYLVANIA.

ADJUSTABLE AXLE-NUT.

SPECIFICATION forming part of Letters Patent No. 459,842, dated September 22, 1891.

Application filed March 9, 1891. Serial No. 384,361. (No model.)

*To all whom it may concern:*

Be it known that we, THOMAS E. SIGLE, of Buyerstown, and ABRAHAM R. WENGER, of West Earl, in the county of Lancaster and State of Pennsylvania, have invented certain new and useful Improvements in an Adjustable Washer-Nut for Vehicle-Wheel Spindles; and we do hereby declare the following to be a full, clear, and exact description of the invention, such as will enable others skilled in the art to which it appertains to make and use the same.

Our invention relates to improvements in an adjustable wheel-spindle nut consisting of a stationary portion telescoping into a movable portion and a screw-threaded shaft or bolt having its outer end extended through and journaled in the head end of the movable portion and its inner end screwed into the head end of the stationary portion, the forward end of the shaft being angular-headed, whereby the portions may be telescopically compressed or extended.

The object of the invention is twofold: the construction of a spindle-nut holding a washer, whereby the lost motion endwise in a hub turning on a spindle or on an axle may be readily taken up without removing the nut from the spindle to rewasher, and to steadily compress the washer to keep said hub endwise in place till the whole of said washer shall be completely worn away.

The purposes of the invention are attained by the mechanism and devices illustrated in the several views of the accompanying drawings, in which similar letters of reference designate like parts throughout, and in which—

Figure 1:
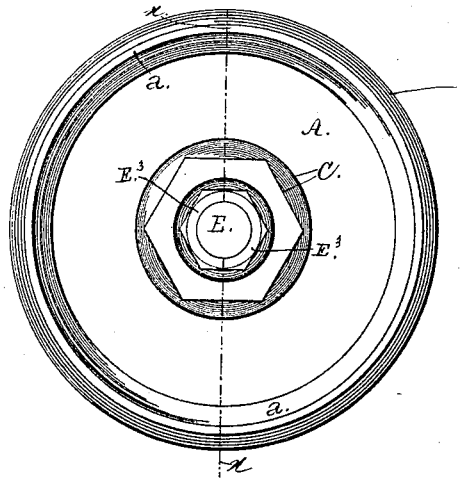
Figure 2:
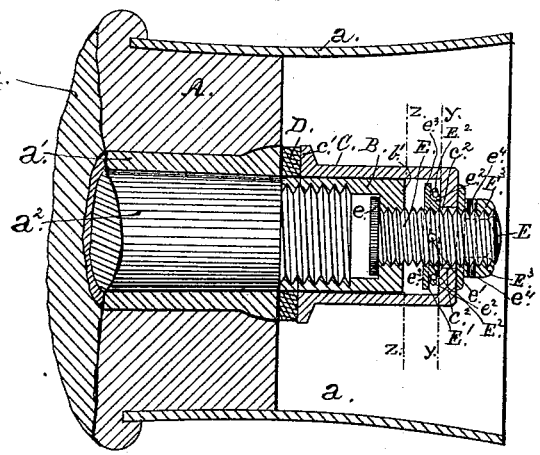
Figure 3:
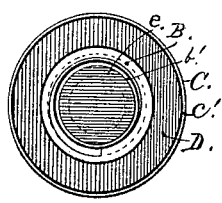
Figure 4:
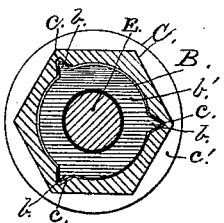
Figure 5:
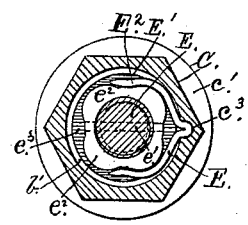
Figure 6:
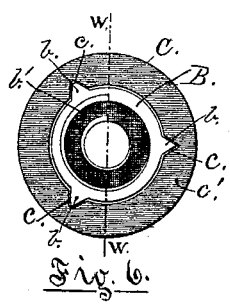
Figure 7:
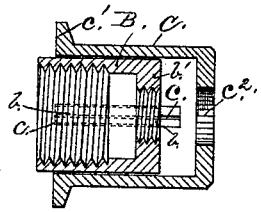

Figure 1 is a front end view of the forward portion of wheel-hub mounted on a spindle, showing a plan of a spindle or axle nut embodying the elements of our invention in place; Fig. 2, a longitudinal vertical section through the line $x\ x$ in Fig. 1; Fig. 3, an inverted plan of the spindle-nut detached from Fig. 1, showing the washer in place; Fig. 4, a reverse view of Fig. 3, the portions to the right of the line $z\ z$ in Fig. 2 cut away; Fig. 5, a similar view as in Fig. 4, the cut being through the line $y\ y$ in Fig. 2 and the portions to the right of said line removed; Fig. 6, a similar view as in Fig. 3 with the washer and adjusting mechanism removed, and Fig. 7 a longitudinal vertical section through the line $w\ w$ in Fig. 6.

A represents the forward end of a common hub; $a$, the hub-band; $a'$, the box, and $a^2$ the axle-spindle, on the threaded end of which is shown in place the adjustable spindle-nut embodying the elements of our invention, and which will now be described.

A cylindrical body or cap B, forming a cylindrical socket screw-threaded on the inside, is secured in the usual way to the forward end of the wheel-spindle. Projecting from the convex surface of this body, leaving space at the inner end for the washer, are angular ridges $b$, parallel to its axis to engage V-grooves in the outside cap or socket yet to be described, and having through its forward end or top $b'$ an orifice screw-threaded within to engage the operating bolt or shaft, also yet to be described. This cap is the inner body and forms the base of our invention.

C designates the outside body or cap, forming a cylindrical socket to receive telescopically the body B, and having in its inner or concave surface angular or V-shaped grooves $c$ to engage the ridges $b$ of the former when the two bodies are placed in position, the engagement of the ridges in the V-shaped grooves compelling said bodies to move simultaneously together. The body C is made angular on the outside like an ordinary nut for turning, and is provided around its open end with an outwardly-projecting flange $c'$, against which is placed a common washer D, to be applied to the wheel in the usual way, while at the center, through its forward or closed end, is an orifice $c^2$, in which is journaled the forward end of the operating or adjusting bolt or shaft.

An operating-bolt E, threaded throughout the length of its shaft and having at its inner end a flat or flanged head $e$, is screwed from within through the threaded orifice in the head of the body B till the head of the bolt is against the head of said body. On the shaft of the bolt is screwed a collar E' and secured thereto by a pin $e'$, leaving a space equal to about the thickness of the washer between said collar and the body B. The collar has a lobed or corrugated portion $e^2$, forming a ratchet having rounded notches, by which a spring-pawl $E^2$, affixed to the body C, as shown at $c^3$, serves to keep the bolt from too easy turning, and a flanged portion $e^3$, which serves to keep the spring in place and confined to the ratchet, and after passing through the orifice $c^2$ in the head of the body C an angular head or nut $E^3$ is screwed onto the outer end of the bolt-shaft and secured thereto by a pin $e^4$, confining the head of the body C to the space between said nut and collar, but not so closely as to prevent the bolt from being easily turned.

The several parts being placed as indicated in the drawings, it will be readily seen that the nut just described may be just as easily removed from or attached to a wheel-spindle and by means of the same wrench as in the case of the ordinary axle-nut now in common use. An inspection of the drawings will also show that as the washer becomes thinner from wear the remaining part may be kept against the wheel by pressing the body C of the nut toward the hub, that this is accomplished by turning the head $E^3$ of the bolt E to the right, and that this operation may be continued till the whole of the washer is worn away, when the nut may be removed from the spindle in the usual way, a new washer put thereon, and the nut replaced upon the spindle.

Having now described our invention and fully shown and set forth its application, what we do consider new and desire to secure by Letters Patent of the United States, is—

1. In an adjustable axle-nut, the herein-described cylindrical socket-screw attachable to a wheel-spindle, having the angular or V-shaped ridges parallel to the axis projecting from its convex surface, and the orifice screw-threaded within through the center of its forward end head, substantially as described, and for the purpose set forth.

2. In an adjustable axle-nut, the herein-described covering-cap having the central orifice through its forward end head to journal the operating-bolt, the angular outside wall faces to turn the nut, the circumferential flange projecting radially outward from its open end to support the washer, and the cylindrical socket provided with the V-shaped grooves to receive telescopically the cylindrical socket-screw having the parallel angular ridges projecting from its convex surface, and the screw-threaded orifice through its forward end head, substantially as described, and for the purpose set forth.

3. In an adjustable axle-nut, the herein-described operating-bolt having at its inner end the flanged head to stop the outward progress of the bolt, and its shaft screw-threaded throughout to be screwed from within and to engage the screw-threaded orifice through the center of the end head of the cylindrical socket-screw, the collar screwed onto the bolt and rigidly secured thereto to bear against the inside of the end head of the angular-faced covering-cap, said collar having the lobed or ratchet portion to receive the action of a spring-pawl secured to the inside of the covering-cap, and the flanged portion to confine the action of said pawl to said ratchet, the bolt journaled in the orifice through the center of the end head of the covering-cap and the angular head or nut screwed onto the outer end of the bolt to bear against the outside of the end head of the covering-cap and rigidly secured to the bolt, whereby said bolt may be turned, all substantially as described, and for the purpose set forth.

4. The combination, in an adjustable axle-nut, with a cylindrical socket-screw having a screw-threaded orifice through the center of its closed end and angular projecting ridges on the convex surface parallel to its axis, and a covering body or cap having a cylindrical socket having in its concave surface V-shaped grooves parallel to its axis, an outside angular wall or face for turning, a circumferential flange projecting outward from its open end joined to the wall, and a journal orifice through the center of its closed end, the cylindrical socket-screw telescoped within the socket of the covering-cap, the angular ridges of the screw in the V-shaped grooves of the cap, of an operating-bolt having a flat head and its shaft screw-threaded throughout, the bolt engaging from within the threaded orifice in the closed end of the socket-screw and the bolt journaled near its forward end in the orifice through the closed end of the cap, a collar having a lobed ratchet portion and a flanged portion rigidly secured to the bolt and bearing within the socket against the closed end of the cap, an angular nut rigidly secured to the forward end of the bolt and bearing without the socket against the closed end of the cap, and a spring-pawl engaging the lobes of the ratchet, secured within the socket to the wall of the cap, all substantially as described, and for the purpose set forth.

In testimony whereof we have hereunto subscribed our names each in the presence of two subscribing witnesses.

THOMAS E. SIGLE.
ABRAHAM R. WENGER.

Witnesses to the signature of Thomas E. Sigle:
  MARTIN W. CLARK,
  BENJAMIN B. CLARK.

Witnesses to the signature of Abraham R. Wenger:
  SAML. D. STAUFFER,
  HOWARD B. STAUFFER.